United States Patent
Bodner et al.

(10) Patent No.: US 10,831,606 B2
(45) Date of Patent: Nov. 10, 2020

(54) AUTOMATIC DIAGNOSTIC MODE TO DETERMINE POTENTIAL CAUSE OF BOOT PROBLEM

(71) Applicant: HEWLETT PACKARD ENTERPRISE DEVELOPMENT LP, Houston, TX (US)

(72) Inventors: James T. Bodner, Houston, TX (US); David Blocker, Houston, TX (US); Darrell R. Haskell, Houston, TX (US); Thomas E. Kessler, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 133 days.

(21) Appl. No.: 16/135,375

(22) Filed: Sep. 19, 2018

(65) Prior Publication Data

US 2020/0089572 A1    Mar. 19, 2020

(51) Int. Cl.
| | |
|---|---|
| G06F 11/00 | (2006.01) |
| G06F 11/14 | (2006.01) |
| G06F 8/61 | (2018.01) |
| G06F 11/07 | (2006.01) |
| G06F 11/22 | (2006.01) |
| G06F 11/36 | (2006.01) |

(52) U.S. Cl.
CPC ............ *G06F 11/1417* (2013.01); *G06F 8/61* (2013.01); *G06F 11/079* (2013.01); *G06F 11/0757* (2013.01); *G06F 11/2284* (2013.01); *G06F 11/366* (2013.01)

(58) Field of Classification Search
CPC ............... G06F 11/0757; G06F 11/079; G06F 11/1417; G06F 11/2284; G06F 11/366
See application file for complete search history.

(56) References Cited

U.S. PATENT DOCUMENTS

| | | | | |
|---|---|---|---|---|
| 5,583,987 | A * | 12/1996 | Kobayashi | G06F 11/006 714/11 |
| 6,560,726 | B1 | 5/2003 | Vrhel et al. | |
| 6,691,225 | B1 | 2/2004 | Suffin | |

(Continued)

OTHER PUBLICATIONS

Extended European search report received for EP Patent Application No. 19189874.1, dated Feb. 14, 2020, 10 pages.

(Continued)

*Primary Examiner* — Elmira Mehrmanesh
(74) *Attorney, Agent, or Firm* — Hewlett Packard Enterprise Patent Department

(57) ABSTRACT

Example implementations relate to automatic diagnostic mode to identify a potential cause of a boot problem of a system. In an example, the automatic diagnostic mode iteratively isolates subsystems of the system in coordination with a baseboard management controller. For each iteration of subsystem isolation, a system boot is executed while a subsystem is isolated. The system boot is monitored against a watchdog timer of the baseboard management controller to determine if the system boot is successful. If the system boot is successful, the isolated subsystem is marked as a potential cause of the boot problem of the system. If the system boot is unsuccessful, the automatic diagnostic mode continues to iteratively isolate the subsystems.

19 Claims, 5 Drawing Sheets

(56) References Cited

U.S. PATENT DOCUMENTS

| | | | |
|---|---|---|---|
| 7,073,053 B1* | 7/2006 | Oz | G06F 11/1417 713/1 |
| 7,266,727 B2* | 9/2007 | Crowell | G06F 11/2284 707/999.202 |
| 7,340,638 B2 | 3/2008 | Nicholson et al. | |
| 7,519,866 B2* | 4/2009 | Crowell | G06F 11/2284 707/999.202 |
| 7,555,677 B1* | 6/2009 | Wiley | G06F 11/2284 713/1 |
| 7,747,893 B2* | 6/2010 | Bailey | G06F 11/1417 714/2 |
| 7,861,117 B2* | 12/2010 | Coronado | G06F 11/1417 713/2 |
| 8,892,944 B2* | 11/2014 | Cheng | G06F 11/1417 713/2 |
| 9,678,762 B2* | 6/2017 | Rosset | G06F 9/4416 |
| 2004/0064761 A1* | 4/2004 | Harrington | G06F 11/1417 714/43 |
| 2004/0078679 A1* | 4/2004 | Cagle | G06F 9/4406 714/36 |
| 2005/0198449 A1* | 9/2005 | Haskell | G06F 13/1694 711/156 |
| 2005/0204123 A1 | 9/2005 | Lee | |
| 2005/0229042 A1 | 10/2005 | Crowell et al. | |
| 2006/0020856 A1 | 1/2006 | Anuez et al. | |
| 2006/0294353 A1* | 12/2006 | Rothman | G06F 11/0766 713/1 |
| 2015/0268967 A1* | 9/2015 | Baker | G06F 9/4405 714/48 |
| 2016/0378602 A1 | 12/2016 | Herzi et al. | |
| 2018/0089047 A1* | 3/2018 | Cooper | G06F 13/4282 |

OTHER PUBLICATIONS

HP Development Company, L.P., "HP Sure Start," Technical White Paper, Feb. 2018, pp. 1-14.

* cited by examiner

AUTOMATIC DIAGNOSTIC MODE TO DETERMINE POTENTIAL CAUSE OF BOOT PROBLEM

BACKGROUND

A computing system, such as a server, may include multiple subsystems, such as hardware, firmware, or software. The computing system may include platform firmware with an interface such as BIOS or UEFI to manage a booting process. During the booting process, the computing system may initialize each of the subsystems.

BRIEF DESCRIPTION OF THE DRAWINGS

Various examples will be described below with reference to the following figures.

Throughout the drawings, identical reference numbers may designate similar, but not necessarily identical, elements.

DETAILED DESCRIPTION

Computing systems such as servers may include platform firmware such as BIOS (Basic Input/Output System) or UEFI (Unified Extensible Firmware Interface) to manage a booting process when computing systems are powered on. During the booting process, a computing system may initialize various subsystems, including hardware components, firmware, and software. However, problems with one or more subsystems may cause boot problems for the computing system, such as long boot times or complete boot failure.

Identifying a root cause or causes of boot problems may involve physical access to the computing system, which may be difficult in remote installations or large datacenters, and time-intensive and costly manual intervention to manually remove and test components one at a time. Moreover, accidental damage may occur in the course of removing subsystems. Also, some subsystems, such as processor sockets, are highly integrated complexes or combinations of multiple subsystems, which may add intricacy and difficulty to isolating and accurately diagnosing the cause of boot problem.

Thus, it may be useful to provide an automatic diagnostic mode in computing systems with multiple subsystems for identifying potential causes of boot problems. Examples described herein may relate to an automatic diagnostic mode that iterates through the multiple subsystems, and, at each iteration, tests whether a different subsystem or combination of subsystems is a potential cause of a boot problem. For example, the testing may include isolating at least one subsystem, attempting to boot the computing system with the subsystem(s) isolated, and monitoring whether the system boot is successful. If the system boot is successful, then the isolated subsystem may be deemed a potential cause of the boot problem. Otherwise, the automatic diagnostic mode may continue to iterate through subsystems until one or more potential causes are identified. The automatic diagnostic mode may be managed by platform firmware of a computing system and in coordination with a baseboard management controller.

By virtue of an automatic diagnostic mode as described herein, potential causes of a boot problem of a system such as a server may be identified more accurately and safely and in a timely manner. For example, subsystems can be diagnosed programmatically without manually removing hardware (including constituent components of complexes like processor sockets), thus reducing the chance for accidental damage to the hardware. Also, by iterating through subsystems in an automated manner, warranty costs may be reduced by accurately identifying failed or problematic components of a system for replacement, rather than replacing the entire system or replacing hardware where only firmware or software is problematic. Moreover, the automatic diagnostic mode may be initiated remotely and automatically, which may reduce overall time to resolution.

Figure 1:
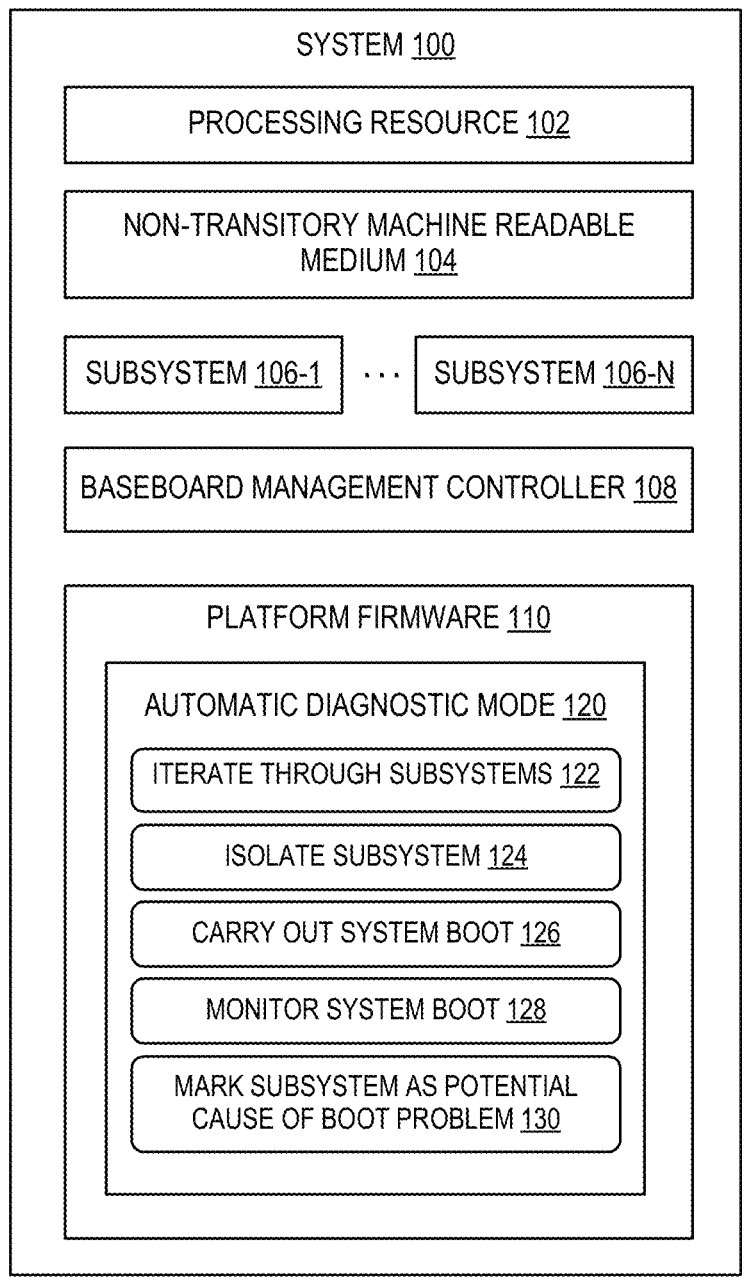
FIG. 1 is a diagram depicting an example system that iteratively isolates subsystems to identify a potential cause of a boot problem.

Referring now to the figures, FIG. 1 is a block diagram depicting an example system 100 that includes an automatic diagnostic mode 120. The system 100 may be a server, a storage array, a networking device such as a switch, or any other electronic or computing device that comprises multiple subsystems and undergoes a boot process.

The system 100 may include a processing resource 102 and a non-transitory machine readable medium 104. Examples of the processing resource 102 may include hardware such as microprocessors, microcontrollers, central processing units (CPUs), application-specific integrated circuits (ASICs), field programmable gate arrays, etc. Examples of the non-transitory machine readable medium 104 (also referred to herein as medium 104 for brevity) may include random access memory (RAM), read-only memory (ROM), electrically erasable programmable read-only memory (EEPROM), flash memory, and other volatile or non-volatile media. The medium 104 is "non-transitory" in that the medium 104 does not encompass transitory propagating signals. The medium 104 may be communicatively coupled to the processing resource 102 and may store instructions executable by the processing resource 102.

The system 100 includes a plurality of subsystems 106-1 through 106-N (also referred to herein collectively as subsystems 106 or individually and generally as a subsystem 106). The subsystems 106 may be defined as a hardware, firmware, or software component of the system 100. As non-limiting examples, a subsystem 106 may be a USB device, a network adapter, a storage controller, a storage device, a video card, a peripheral device, a bus, a PCIe adapter/slot or any other type of peripheral interface, memory (e.g., a dual inline memory module or DIMM), a memory controller, a processor (e.g., a CPU), a software UEFI network stack, a software UEFI USB stack, etc. In some examples, a subsystem 106 may comprise other subsystems, or said another way, multiple subsystems 106 may be grouped together in a functional unit. For example, a processor socket may be a subsystem 106, but some implementations of a processor socket subsystem may further be described as a complex comprising constituent subsystems of a CPU, memory, and bus (e.g., PCI).

The system 100 further includes a baseboard management controller (BMC) 108. In some examples, the BMC 108 can be used to implement services for the system 100. The BMC 108 can be implemented using a processor separate from the processing resource 102 that executes a high level operating system. The BMC 108 can provide "lights-out" functionality for the system 100. Lights out functionality may allow a user, such as a systems administrator, to perform management operations on the system 100 even if an operating system is not installed or not functional on the system 100. Moreover, in one example, the BMC 108 can run on auxiliary power, thus the system 100 need not be powered on to an "on" state where control of the system 100 is handed over to an operating system after boot. As examples, the BMC 108 may provide "out-of-band" services, such as remote console access, remote reboot and power management functionality, monitoring health of the system, access to system logs, and the like. As used herein, the BMC 108 has management capabilities for at least some of the subsystems 106, and is separate from a processor or the processing resource 102 that executes a main operating system of the system 100.

As noted, in some instances, the BMC 108 may enable lights-out management of the system 100, which provides remote management access (e.g., system console access) regardless of whether the system 100 is powered on, whether a primary network subsystem hardware is functioning, or whether an operating system is operating or even installed. The BMC 108 may comprise an interface, such as a network interface, and/or serial interface that an administrator can use to remotely communicate with the BMC 108. As used herein, an "out-of-band" service is a service provided by the BMC 108 via a dedicated management channel (e.g., the network interface or serial interface) and is available regardless of whether the system 100 is in powered on state.

In some examples, a BMC 108 may be included as part of an enclosure.

In other examples, a BMC 108 may be included in the system 100 (e.g., as part of the management subsystem of the system 100) or connected via an interface (e.g., a peripheral interface). The BMC 108 may include a watchdog timer that counts down until it expires (i.e., "times out") or is reset before expiring by a system process for example. The BMC 108 may also be capable to reboot or power cycle the device. As noted, the BMC 108 allows for remote management of the system 100, and as such, notifications can be made to a centralized station using the BMC 108 and passwords or other user entry can be implemented via the BMC 108.

The system 100 includes platform firmware 110 that can be implemented using instructions executable by a processor and/or logic. For example, such instructions may be stored on the non-transitory machine readable medium 104 and may be executed by the processing resource 102. As will be discussed below, the platform firmware 110 may include instructions that function as automatic diagnostic mode 120.

Platform firmware 110 may include an interface such as a basic input/output system (BIOS) or unified extensible firmware interface (UEFI) to allow it to be interfaced with. The platform firmware 110 can be located at an address space where the processing resource 102 (e.g., CPU) for the system 100 boots. In some examples, the platform firmware 110 may be responsible for a power on self-test (POST) that is part of a boot process for the system 100. In other examples, the platform firmware 110 can be responsible for the boot process and what, if any, operating system to load onto the system 100. Further, the platform firmware 110 may initialize and configure various subsystems 106 of the system 100, such as those described above. In some implementations, the platform firmware 110 and the BMC 108 may be in communication.

As described above, the platform firmware 110 may include processor-executable instructions for the automatic diagnostic mode 120. As will be discussed in greater detail below, the automatic diagnostic mode 120 is a routine of the platform firmware 110 that is launched to automatically and programmatically (e.g., without manual intervention) identify one or more problematic subsystems preventing normal booting of the system 100 by iteratively isolating (e.g., disabling) subsystems of the system 100, rebooting the system 100, and determining if isolating the subsystem allowed the boot to complete normally. The automatic diagnostic mode 120 may be a state machine operated by the platform firmware 110. The functionality of the automatic diagnostic mode 120 discussed below may be understood to be ultimately performed by the processing resource 102.

The platform firmware 110 may implement the automatic diagnostic mode 120 when a boot problem of the system 100 is detected. Example boot problems may include long boot times, boot failures (failure to complete POST process), or other abnormal boot behavior. In some implementations, the platform firmware 110 detects the boot problem. In some implementations, the BMC 108 autonomously detects the boot problem and triggers the platform firmware 110 to implement the automatic diagnostic mode 120. For example, the BMC 108 may autonomously detect a boot problem by measuring a current elapsed boot time of system 100 (e.g., time in POST process) and comparing the current elapsed system boot time against historical system boot times measured by the BMC 108. Current elapsed boot times that exceed historical system boot times may be indicative of a boot problem and may cause the BMC 108 to trigger the automatic diagnostic mode 120.

In some cases, the BMC 108 may fail to trigger the platform firmware 110 to start the automatic diagnostic mode 120. For example, a problematic subsystem 106 may be preventing the platform firmware 110 from behaving properly and from starting the automatic diagnostic mode 120. These issues may appear to the BMC 108 as communication failures with the platform firmware 110 or that the platform firmware 110 is unresponsive. In such cases, the BMC 108, running on auxiliary power, may disable or otherwise isolate one or more subsystems 106 to restore the platform firmware 110 to be able to perform the automatic diagnostic mode 120. The BMC 108 may perform an iterative isolation similar to that of the automatic diagnostic mode 120, at least with respect to subsystems 106 that the BMC 108 can control.

In some implementations, a user, such as an administrator, may initiate the automatic diagnostic mode 120. For example, the platform firmware 110 may provide a local control at the system 100 (e.g., a keyboard hot key) for a user to commence the automatic diagnostic mode 120. As another example, the BMC 108 may provide a remote user interface having a control that initiates or triggers the platform firmware 110 to initiate the automatic diagnostic mode 120, by virtue of lights-out management and/or out-of-band service capabilities of the BMC 108.

The automatic diagnostic mode 120 iterates 122 through the plurality of subsystems 106. At each iteration, the automatic diagnostic mode 120 isolates 124 at least one subsystem 106 of the plurality of subsystems 106-1 through 106-N. The isolated subsystem may be hardware, firmware, or software. In some iterations, the at least one subsystem 106 that is isolated may include a combination of subsystems. For instance, it may be useful to isolate combinations of subsystems, particularly when multiple subsystems are causing boot problems.

The automatic diagnostic mode 120 may have access to a list of subsystems 106 and any combinations of subsystems 106 to be tested iteratively and may track tested subsystems as iterations are completed. The list may be generated automatically by the platform firmware 110 or may be provided to the automatic diagnostic mode 120 by an administrator in a configuration file or the like.

Isolating 124 a subsystem 106 may involve fully disabling the subsystem 106, partially disabling the subsystem 106 (e.g., placing the subsystem 106 in a safe mode with reduced or basic functionality), configuring the subsystem 106 to factory default or baseline settings, bypassing the subsystem 106, or the like. In another example, isolating 124 may include flashing a different firmware version (e.g., higher or lower version) for the subsystem 106 to be isolated, to determine if firmware version is a potential cause of the boot problem. In some iterations, a software or firmware of a subsystem 106 may be disabled instead of disabling an associated hardware component (the hardware may continue to operate), in order to test if software compatibility is associated with a potential cause of the boot problem.

In some examples, the system 100 may have a processor socket that is a complex composed of components including a processor, memory, and a bus (e.g., PCI). Some systems may have multiple such processor sockets. Each of the components and the processor socket itself may be deemed a subsystem 106. Accordingly, the automatic diagnostic mode 120 may isolate, in different iterations, the entire processor socket, individual components of a processor socket, or combinations of components of the processor socket, as will also be described below with respect to FIG. 3.

In some implementations, the automatic diagnostic mode 120 may coordinate with the BMC 108 to isolate a subsystem or subsystems 106. For example, the automatic diagnostic mode 120 may request the BMC 108 to flash firmware, isolate individual subcomponents of a processor socket, or disable a subsystem 106, as described above. In some cases, subsystem isolation can be performed by the BMC 108 by virtue of its out-of-band or lights-out management capabilities, but may not be possible by the platform firmware 110 (including by BIOS or UEFI), by the processing resource 102, or by any other embedded controller of the system 100.

With at least one subsystem 106 isolated, the automatic diagnostic mode 120 carries out 126 a system boot. Depending on the implementation, carrying out 126 a system boot may include either starting the boot process or continuing with a boot process, but in either case, a subsystem 106 has been isolated. For example, the automatic diagnostic mode 120 may cause the platform firmware 110 to start or continue with a POST process.

In some implementations, to isolate 124 a subsystem 106, the automatic diagnostic mode 120 may need the system boot to be in progress and at a point where the platform firmware 110 has the ability to isolate the subsystem 106 and, in such cases, carrying out 126 the system boot means to continue the boot sequence. In some implementations, the automatic diagnostic mode 120 can coordinate with the BMC 108 to isolate a subsystem 106 before the system boot is started, owing to the lights-out functionality of the BMC 108, which can reduce reliance on the platform firmware 110 to perform the isolation 124.

As the system boot is carried out, the automatic diagnostic mode 120 may enable a watchdog timer of the BMC 108 to assist with detecting whether the system boot completes successfully. The watchdog timer may be configured to count down from a predetermined acceptable duration for a system boot, which may be determined from historical measurements for example.

While the watchdog timer is counting down, the automatic diagnostic mode 120 may monitor 128 the system boot, and in particular, monitor whether the system boot has completed. If the watchdog timer expires, the system boot has not completed successfully, and the automatic diagnostic mode 120 continues to iterate through the plurality of subsystems 106 (in some implementations, the watchdog timer may force the automatic diagnostic mode 120 to continue).

On the other hand, if the system boot completes without the watchdog timer expiring, then it may be determined that the subsystem(s) 106 isolated during the current system boot may be a potential cause of the boot problem. In some implementations, the automatic diagnostic mode 120 may mark 130 that isolated subsystem(s) as a potential cause of the boot problem.

In some implementations, if an isolated subsystem 106 has been identified and marked as a potential cause, the automatic diagnostic mode 120 may still continue to iterate through subsystems to narrow down the potential cause. For example, if the marked subsystem 106 (deemed a "high-level subsystem") is a combination of other subsystems, further iterations may isolate and separately test each of constituent subsystems (deemed "lower-level subsystems"). In other words, a high-level subsystem is defined as a subsystem that can be isolated by the automatic diagnostic mode 120 but is also comprised of lower-level subsystems that can be independently isolated by the automatic diagnostic mode 120.

To illustrate, a processor socket may be an example of a high-level subsystem, and the CPU, memory, and bus of the processor socket are associated lower-level subsystems. In the case where a processor socket was isolated and then marked as a potential cause of the boot problem, further iterations may isolate each of the CPU, memory, and a bus of the socket individually to narrow down the potential cause of the boot problem.

In another example, an isolatable high-level subsystem may be a memory controller or all memory on a CPU or all memory on a particular memory channel, and a corresponding isolatable lower-level subsystem may be a specific DIMM. In another example, an isolatable high-level subsystem may be all PCIe slots or devices associated with a processor socket, and a corresponding isolatable lower-level subsystem may be an individual PCIe slot or device. In another example, an isolatable high-level subsystem may be all USB ports, and an isolatable lower-level subsystems may include external USB ports as a group, internal USB ports as a group, or individual USB ports.

Iterative isolation by the automatic diagnostic mode 120 may be monitored and coordinated by the BMC 108 in some implementations. For example, in some cases, the platform firmware 110 and thus the automatic diagnostic mode 120 may fail to respond after the watchdog timer expires and the system boot has not completed successfully, due to the type or severity of subsystem problem. In such instances, the BMC 108 may detect that the automatic diagnostic mode 120 is unresponsive and the BMC 108 may itself isolate a subsystem 106 in an attempt to restore the automatic diagnostic mode 120. The BMC 108 may isolate subsystems that have not already been isolated and tested by the automatic diagnostic mode 120.

When a potential cause or causes of the boot problem has been identified and marked, the automatic diagnostic mode 120 may report the cause or causes through a graphical user interface, through a data file, through a remote user interface via the BMC 108, or other means of conveying information. Also, the platform firmware 110 may end the automatic diagnostic mode 120. An administrator or user may then verify the potential cause or causes identified by the automatic diagnostic mode 120.

Figure 2:
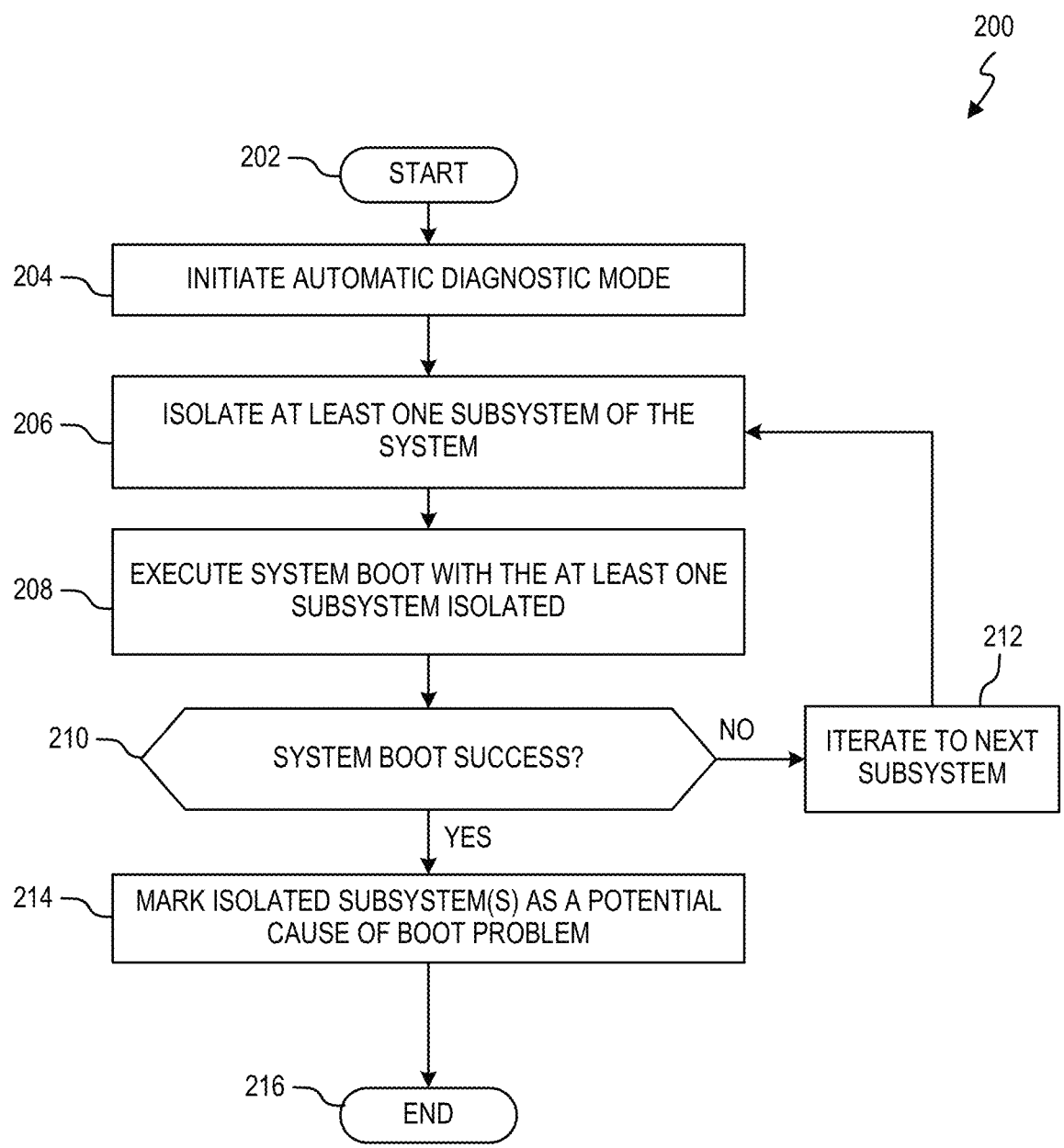
FIG. 2 is a flow diagram depicting an example method for iteratively isolating subsystems to identify a potential cause of a boot problem.
Figure 3:
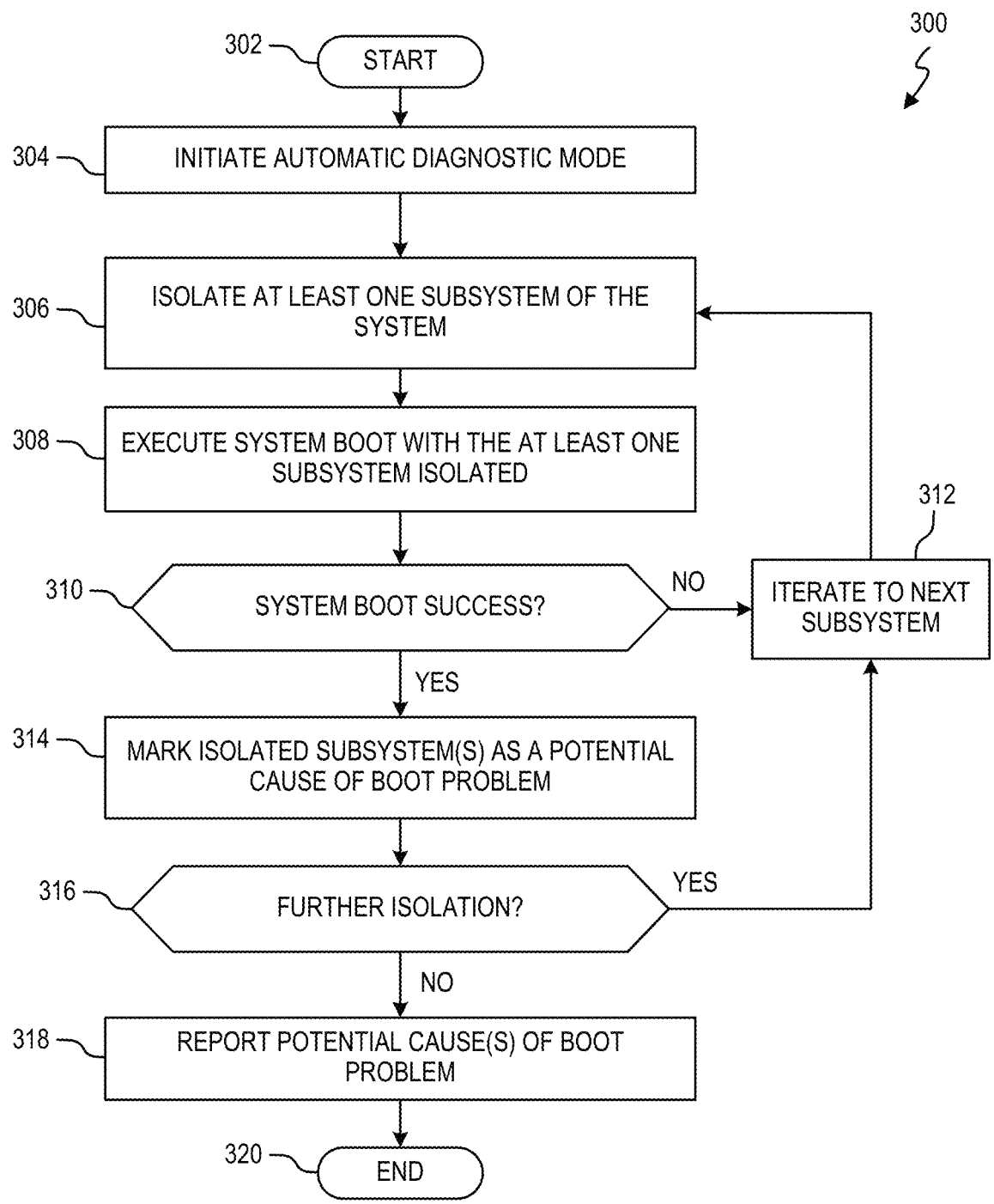
FIG. 3 is a flow diagram depicting another example method for iteratively isolating subsystems to identify a potential cause of a boot problem.

FIGS. 2 and 3 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat. The methods may be implemented in the form of executable instructions stored on a non-transitory machine readable medium (e.g., such as medium 104) and executed by a processing resource (e.g., such as processing resource 102) and/or in the form of electronic circuitry. In some examples, platform firmware 110 may be useful for performing the methods.

FIG. 2 is a flow diagram depicting an example method 200 of an automatic diagnostic mode for determining a potential cause of a boot problem of a system (e.g., a server, a storage array, a networking device, etc.) that has a plurality of subsystems (e.g., hardware, software, firmware) that are initialized during boot. Method 200 begins at block 202 and continues to block 204, where a platform firmware executing on a processing resource of a system initiates an automatic diagnostic mode. Block 204 may be performed in response to detection of the boot problem by a BMC of the system. The automatic diagnostic mode is performed by the platform firmware in the following blocks 206, 208, 210, 212, 214, to programmatically and iteratively test individual subsystems or combinations of subsystems of the system to identify a potential cause or causes of the boot problem.

At block 206, the platform firmware isolates a subsystem of the plurality of subsystems of the system. The platform firmware may perform block 206 to isolate a plurality of subsystems simultaneously or a plurality of subsystems in combination. As discussed above, isolating a subsystem may include fully disabling the subsystem, partially disabling the subsystem (e.g., reducing functionality), configuring the subsystem to factory default or baseline settings, bypassing the subsystem, etc. Isolating may also include flashing a different firmware version (e.g., higher or lower version) for the subsystem to determine if firmware version is a potential cause of the boot problem.

In iterations of the automatic diagnostic mode, the different subsystems or combinations of subsystems that may be isolated include hardware, software, or firmware. In some iterations, an entire integrated processor socket may be isolated, and in other iterations, individual components of the integrated processor socket (e.g., CPU, memory, or bus) can be isolated.

The isolation may be performed by the platform firmware alone or by the platform firmware in coordination with the BMC, depending on the type of isolation. For example, some isolation may be performed by the BMC more efficiently or earlier in or before the boot process by virtue of the BMC having lights-out management and/or out-of-band service capabilities. In other examples, the isolation cannot be performed by any component other than the BMC (e.g., an isolation involving flashing firmware), and thus the platform firmware coordinates with the BMC to perform such isolation.

At block 208, the platform firmware executes a system boot (e.g., including a POST process) with the subsystem isolated. Executing may include starting or continuing the system boot. For example, the platform firmware may have to reach a particular point in the boot process to disable the subsystem at block 206, in which case, block 208 includes continuing the system boot. In other examples, the BMC of the system may isolate the subsystem before the system boot is initiated, in which case, block 208 includes starting or initiating the system boot. In any case, block 208 refers to performing at least part of the system boot with the subsystem having been isolated. The platform firmware may enable a watchdog timer of the BMC upon executing the system boot at block 208.

At block 210, the platform firmware determines whether the system boot is successful. The platform firmware may monitor the system boot against the watchdog timer of the BMC. The platform firmware may determine that the system boot is successful if the system boot completes before the watchdog timer expires. If the watchdog timer expires, then the platform firmware may determine that the system boot is unsuccessful.

If the system boot is determined to be unsuccessful ("NO" at block 210), method 200 proceeds to block 212, where the platform firmware iterates to a different subsystem of the plurality of subsystems and repeats the process to isolate the different subsystem (block 206), execute a system boot with the different subsystem isolated (block 208), determine whether the system boot is successful (block 210), and marking the different subsystem if the system boot was successful (block 214).

If the system boot is determined to be successful ("YES" at block 210), method 200 proceeds to block 214, where the platform firmware marks the subsystem that was isolated at block 206 as a potential cause of the boot problem. If a combination of subsystems was isolated, the combination may be marked as a potential cause. The platform firmware may then end the automatic diagnostic mode, and the method 200 proceeds to end at block 216.

FIG. 3 is a flow diagram depicting an example method 300 of an automatic diagnostic mode, performed by a platform firmware, for determining a potential boot problem of a system that has multiple subsystems. The method 300 begins at block 302. Blocks 304, 306, 308, 310, 312, 314 may be analogous in many respects to blocks 204, 206, 208, 210, 212, 214, respectively, of method 200 described above. After a subsystem is marked as a potential cause of the boot problem at block 314, the platform firmware may determine whether further isolation is warranted. For example, the platform firmware may determine to proceed with further isolation because the marked subsystem is a combination of subsystems or a subsystem with constituent components that can be further isolated. To illustrate, an integrated processor socket may be isolated in a previous iteration to identify which processor socket in a system having multiple sockets is causing the boot problem. In subsequent iterations, the platform firmware may programmatically isolate individual components of the marked processor socket, such as CPU, memory, and bus, (also described above as lower-level subsystems) to narrow down the cause of the boot problem within that processor socket (also described above as a high-level subsystem).

If additional isolation is warranted ("YES" at block 316), method 300 proceeds to block 312, where the platform firmware iterates to a lower-level subsystem of the previously marked high-level subsystem and then proceeds to repeat the testing cycle through blocks 306, 308, 310, and/or 314 with that lower-level subsystem. If isolating that constituent subsystem does not result in a successful system boot ("NO" at block 310), then the platform firmware iterates to the next lower-level subsystem at block 312, and so on, until all lower-level subsystems included in the high-level subsystem have been tested. Combinations of lower-level subsystems also may be isolated and tested.

If additional isolation is not warranted ("NO" at block 316) because, for example, the marked subsystem is not further divisible or all lower-level subsystems have been tested, method 300 proceeds to block 318, where the platform firmware reports the marked subsystems as identified potential cause(s) of the boot problem. For example, the potential cause(s) may be displayed on a display connected to the system, recorded in a data file on the system, displayed on a remote user interface via the BMC, or other means of conveying information. The method 300 ends at block 320.

Figure 4:
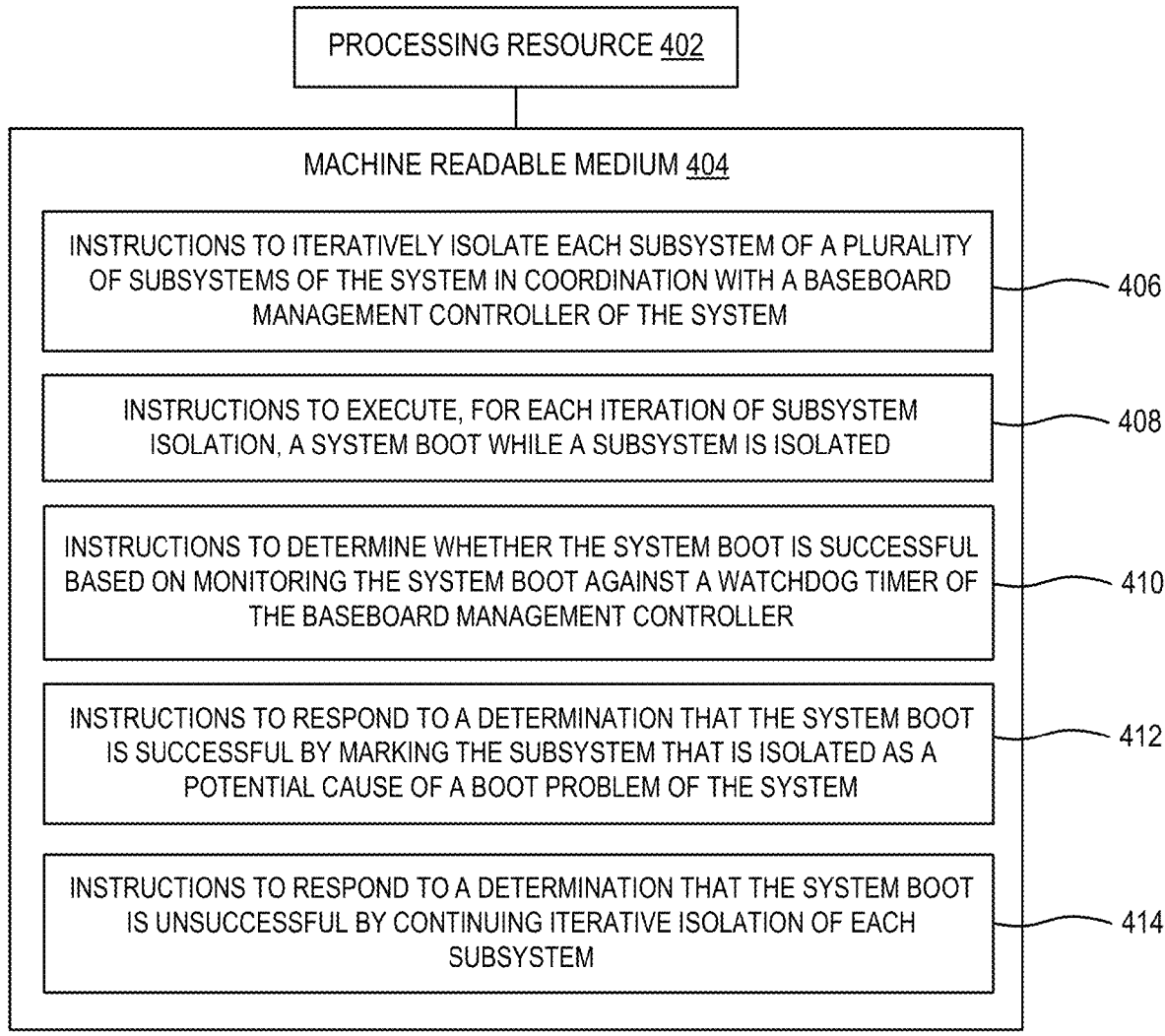
FIG. 4 is a diagram of an example non-transitory machine readable medium encoded with instructions for iteratively isolating subsystems to identify a potential cause of a boot problem.

FIG. 4 is a block diagram of an example that includes a processing resource 402 coupled to a non-transitory machine readable medium 404 encoded with example instructions. The processing resource 402 may include a microcontroller, a microprocessor, central processing unit core(s), an ASIC, an FPGA, and/or other hardware device suitable for retrieval and/or execution of instructions from the machine readable medium 404 to perform functions related to various examples. Additionally or alternatively, the processing resource 402 may include electronic circuitry for performing the functionality of the instructions described herein. The processing resource 402 may serve as or be analogous to the processing resource 102 of the system 100, and the non-transitory machine readable medium 404 may serve as or be analogous to the medium 104 of the system 100.

The non-transitory machine readable medium 404 may be any medium suitable for storing executable instructions, such as RAM, ROM, EEPROM, flash memory, a hard disk drive, an optical disc, or the like. The machine readable medium 404 may be disposed within a system (such as a server), in which case the executable instructions may be deemed "installed" or "embedded" on the system. Alternatively, the machine readable medium 404 may be a portable (e.g., external) storage medium, and may be part of an "installation package."

As described further herein below, the machine readable medium 404 may be encoded with a set of executable instructions 406, 408, 410, 412, 414. It should be understood that part or all of the executable instructions and/or electronic circuits included within one box may, in alternate implementations, be included in a different box shown in the figures or in a different box not shown. The instructions 406, 408, 410, 412, 414 may be useful for implementing aspects of the automatic diagnostic mode 120 or for performing aspects of method 200 or 300, to identify a potential cause of a boot problem of a system.

Instructions 406, upon execution, cause the processing resource 402 to iteratively isolate subsystems of a plurality of subsystems of the system, in coordination with a BMC of the system where appropriate. For example, instructions 406 may manage the overall looping process of method 200 or 300, tracking which subsystems or combinations of subsystems have been isolated and tested as a potential cause of a boot problem. As discussed above, isolation by instructions 406 may include fully disabling a subsystem, partially disabling a subsystem, configuring a subsystem to factory default or baseline settings, bypassing a subsystem, etc.

The isolated subsystems may include hardware, software, firmware, individual components of an integrated processor socket complex, different combinations of subsystems, and the like. In some cases, software subsystems may be disabled instead of hardware subsystems, so as to eliminate possible software compatibility issues while avoiding disabling hardware components.

Instructions 408, upon execution, cause the processing resource 402 to execute, for each iteration of subsystem isolation, a system boot while a subsystem is isolated. Instructions 408 may also enable a watchdog timer of the BMC.

Instructions 410, upon execution, cause the processing resource 402 to determine whether the system boot is successful based on monitoring the system boot against a watchdog timer of the baseboard management controller. For example, if instructions 410 detects that the system boot has completed before the watchdog timer expires, then the system boot is deemed to be successful. On the other hand, if the watchdog timer expires, the instructions 410 deem the system boot to be unsuccessful.

Instructions 412, upon execution, cause the processing resource 402 to respond to a determination that the system boot is successful by marking the subsystem that is isolated as a potential cause of a boot problem of the system. Instructions 414, upon execution, cause the processing resource 402 to respond to a determination that the system boot is unsuccessful by continuing iterative isolation of the subsystems (e.g., via instructions 406).

Figure 5:
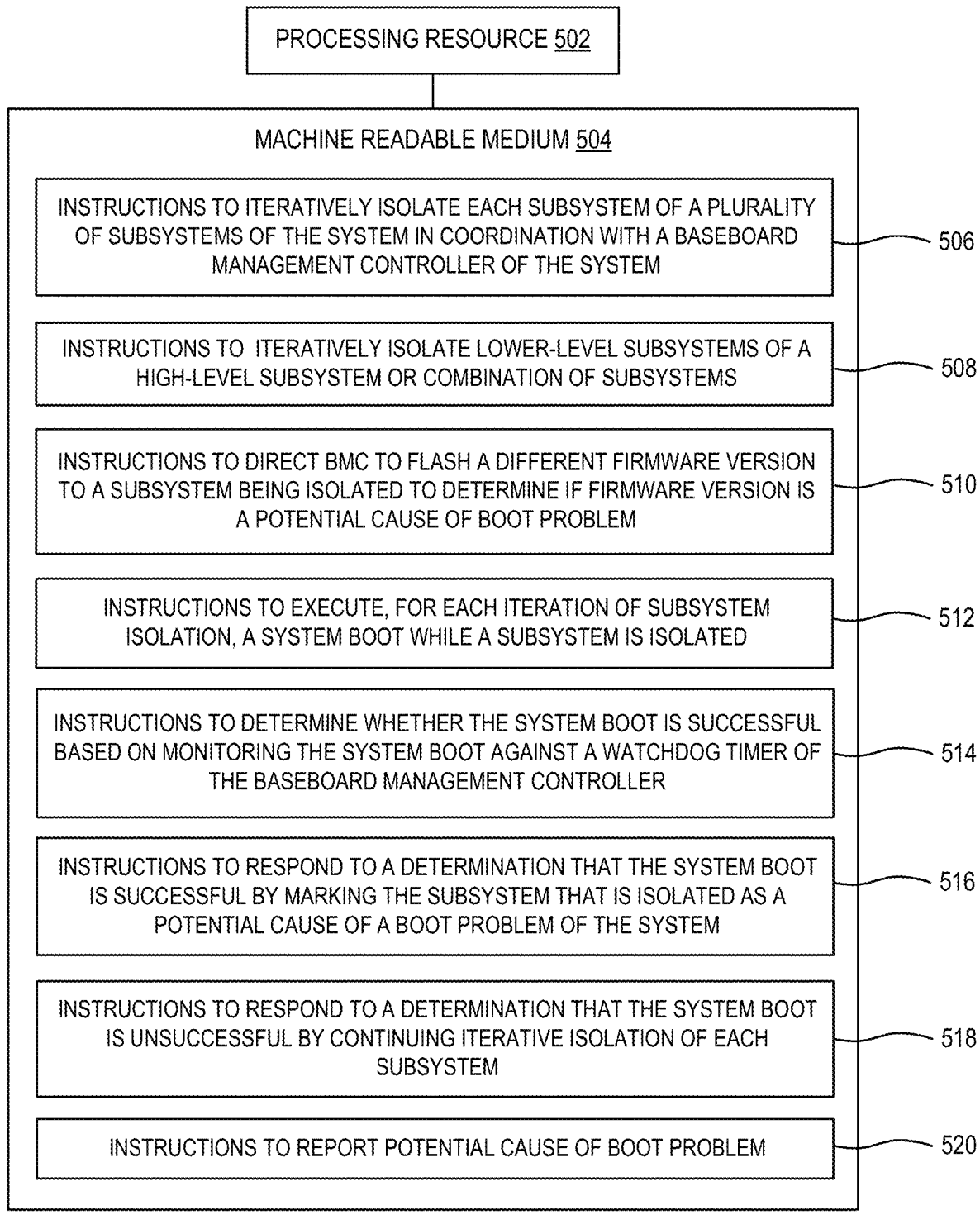
FIG. 5 is a diagram of another example non-transitory machine readable medium encoded with instructions for iteratively isolating subsystems to identify a potential cause of a boot problem.

FIG. 5 depicts a processing resource 502 coupled to a non-transitory machine readable medium 504 encoded with example instructions. The processing resource 502 and the machine readable medium 504 may be analogous in many respects to the processing resource 402 and the machine readable medium 404, respectively.

The machine readable medium 504 may be encoded with a set of executable instructions 506, 508, 510, 512, 514, 516, 518. It should be understood that part or all of the executable instructions and/or electronic circuits included within one box may, in alternate implementations, be included in a different box shown in the figures or in a different box not shown. Some implementations of may include more or fewer instructions than are shown in FIG. 5. The instructions 506, 508, 510, 512, 514, 516, 518 may be useful for implementing aspects of the automatic diagnostic mode 120 or for performing aspects of method 200 or 300, to identify a potential cause of a boot problem of a system.

Instructions 506, 512, 514, 516, 518 may be analogous in many respects to instructions 406, 408, 410, 412, 414, respectively. Instructions 508, when executed, may cause the processing resource 502 to iteratively isolate lower-level subsystems of a high-level subsystem or combination of subsystems. For example, similar to block 316 of method 300 discussed above, a high-level subsystem such as a processor socket may be marked as a potential cause of a boot problem, and instructions 508 may iterate through constituent subsystems of that high-level subsystem to narrow down the potential cause of the boot problem.

Instructions 510, when executed, cause the processing resource 502 to direct a BMC to flash a different firmware version to a subsystem being isolated to determine if firmware version is a potential cause of the boot problem. For example, instructions 510 may be useful for implementing an isolation performed by instructions 508.

Instructions 520, when executed, cause the processing resource 502 to report a potential cause of boot problem marked by instructions 516. For example, instructions 520 may cause display of the potential cause on a graphical user interface, may save the potential cause to a data file, may transmit the potential cause to a remote user interface via the BMC, or use other means of conveying information. An administrator may verify the reported potential cause.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
a plurality of subsystems;
a baseboard management controller; and
platform firmware, executing on a processing resource, to implement an automatic diagnostic mode when a boot problem of the system is detected, the automatic diagnostic mode including:
iterating through the plurality of subsystems,
at each iteration of the iterating,
isolating at least one subsystem of the plurality of subsystems in coordination with the baseboard management controller,
carrying out a system boot with the at least one subsystem isolated,
monitoring the system boot against a watchdog timer of the baseboard management controller,
if the system boot completes without the watchdog timer expiring, mark the at least one subsystem that is isolated as a potential cause of the boot problem, and
if the watchdog timer expires, continue iterating through the plurality of subsystems,
wherein the baseboard management controller is to:
detect that the automatic diagnostic mode is unresponsive and,
in response to detecting that the automatic diagnostic mode is unresponsive, restore the automatic diagnostic mode by isolating, by the baseboard management controller, subsystems that have not been previously isolated by the automatic diagnostic mode.

2. The system of claim 1, wherein the plurality of subsystem includes multiple processor sockets, each of the processor sockets comprising components including a processor, memory, and a bus, and
isolating the at least one subsystem includes disabling one of the components of a processor socket of the multiple processor sockets.

3. The system of claim 1, wherein the at least one subsystem that is isolated includes firmware or software.

4. The system of claim 1, wherein the baseboard management controller provides a remote user interface with a control to initiate the automatic diagnostic mode.

5. The system of claim 1, wherein the baseboard management controller isolates the at least one subsystem before the system boot is initiated.

6. The system of claim 1, wherein the at least one subsystem includes a combination of subsystems of the plurality of subsystems.

7. The system of claim 1, where in a first iteration the isolating includes disabling a software subsystem instead of disabling an associated hardware component to test if software compatibility is associated with the potential cause of the boot problem.

8. The system of claim 1, wherein in a first iteration the isolating includes flashing, by the baseboard management controller, a different firmware version for the at least one subsystem to determine if firmware version is the potential cause of the boot problem.

9. The system of claim 1, wherein the baseboard management controller is to autonomously detect the boot problem and trigger the platform firmware to execute the automatic diagnostic mode.

10. The system of claim 9, wherein the baseboard management controller is to autonomously detect the boot problem by comparing a current system boot time against historical system boot times measured by the baseboard management controller.

11. A method comprising:
initiating, by a platform firmware executing on a processing resource of a system, an automatic diagnostic mode responsive to detection by a baseboard management controller of a boot problem of the system;
isolating, by the platform firmware in coordination with the baseboard management controller, a subsystem of a plurality of subsystems of the system;
executing, by the platform firmware, a system boot with the subsystem isolated;
determining, by the platform firmware, whether the system boot is successful based on monitoring the system boot against a watchdog timer of the baseboard management controller;
marking, by the platform firmware, the subsystem that is isolated as a potential cause of the boot problem if the system boot is determined to be successful; and
if the system boot is determined to be unsuccessful, iterating, by the platform firmware, to a different subsystem of the plurality of subsystems and repeating the isolating, executing, determining, and marking with the different subsystem,
wherein the isolating includes flashing, by the baseboard management controller, a different firmware version for the subsystem to determine if firmware version is the potential cause of the boot problem.

12. The method of claim 11, wherein the plurality of subsystems includes software, firmware, and individual components of an integrated processor socket.

13. The method of claim 11, wherein the isolating of the subsystem is performed by the baseboard management controller before the system boot is initiated.

14. The method of claim 11, further comprising enabling a watchdog timer of the baseboard management controller upon executing the system boot,
wherein the system boot is determined to be successful if the system boot completes before the watchdog timer expires and the system boot is determined to be unsuccessful if the watchdog timer expires.

15. A non-transitory machine readable medium storing instructions for an automatic diagnostic mode executable by a processing resource of a computing system, the non-transitory machine readable medium comprising:
instructions to iteratively isolate subsystems of a plurality of subsystems of the system in coordination with a baseboard management controller of the system;
instructions to execute, for each iteration of subsystem isolation, a system boot while a subsystem is isolated;

instructions to determine whether the system boot is successful based on monitoring the system boot against a watchdog timer of the baseboard management controller;

instructions to respond to a determination that the system boot is successful by marking the subsystem that is isolated as a potential cause of a boot problem of the system; and instructions to respond to a determination that the system boot is unsuccessful by continuing iterative isolation of the subsystems, wherein the instructions to iteratively isolate subsystems includes iteratively isolating different combinations of subsystems.

16. The non-transitory machine readable medium of claim 15, wherein the plurality of subsystems to be iteratively isolated includes software, firmware, and individual components of an integrated processor socket.

17. The non-transitory machine readable medium of claim 15, wherein the instructions to iteratively isolate includes directing the baseboard management controller to flash a different firmware version to a subsystem being isolated to determine if firmware version is the potential cause of the boot problem.

18. A system comprising:
a plurality of subsystems;
a baseboard management controller; and
platform firmware, executing on a processing resource, to implement an automatic diagnostic mode when a boot problem of the system is detected, the automatic diagnostic mode including:
iterating through the plurality of subsystems,
at each iteration of the iterating,
isolating at least one subsystem of the plurality of subsystems in coordination with the baseboard management controller,
carrying out a system boot with the at least one subsystem isolated,
monitoring the system boot against a watchdog timer of the baseboard management controller,
if the system boot completes without the watchdog timer expiring, mark the at least one subsystem that is isolated as a potential cause of the boot problem, and
if the watchdog timer expires, continue iterating through the plurality of subsystems,
wherein the baseboard management controller is to autonomously detect the boot problem and trigger the platform firmware to execute the automatic diagnostic mode,
wherein the baseboard management controller is to autonomously detect the boot problem by comparing a current system boot time against historical system boot times measured by the baseboard management controller.

19. A system comprising:
a plurality of subsystems;
a baseboard management controller; and
platform firmware, executing on a processing resource, to implement an automatic diagnostic mode when a boot problem of the system is detected, the automatic diagnostic mode including:
iterating through the plurality of subsystems,
at each iteration of the iterating,
isolating at least one subsystem of the plurality of subsystems in coordination with the baseboard management controller,
carrying out a system boot with the at least one subsystem isolated,
monitoring the system boot against a watchdog timer of the baseboard management controller,
if the system boot completes without the watchdog timer expiring, mark the at least one subsystem that is isolated as a potential cause of the boot problem, and
if the watchdog timer expires, continue iterating through the plurality of subsystems,
where in a first iteration the isolating includes disabling a software subsystem instead of disabling an associated hardware component to test if software compatibility is associated with the potential cause of the boot problem.

* * * * *